(12) United States Patent
Naylor

(10) Patent No.: US 9,053,585 B2
(45) Date of Patent: Jun. 9, 2015

(54) SYSTEM AND METHOD FOR MONITORING OPERATION OF VEHICLES

(71) Applicant: NEW FLYER INDUSTRIES CANADA ULC, Winnipeg (CA)

(72) Inventor: David Glen Naylor, Winnipeg (CA)

(73) Assignee: NEW FLYER INDUSTRIES CANADA ULC, Winnipeg MP (CA)

(*) Notice: Subject to any disclaimer, the term of this patent is extended or adjusted under 35 U.S.C. 154(b) by 0 days.

(21) Appl. No.: 13/974,791

(22) Filed: Aug. 23, 2013

(65) Prior Publication Data

US 2014/0095047 A1 Apr. 3, 2014

Related U.S. Application Data

(62) Division of application No. 12/651,655, filed on Jan. 4, 2010, now Pat. No. 8,548,669.

(60) Provisional application No. 61/143,325, filed on Jan. 8, 2009.

(51) Int. Cl.
*G01M 17/00* (2006.01)
*G07C 5/00* (2006.01)
*G06Q 10/04* (2012.01)
*G06Q 10/06* (2012.01)
*G06Q 50/30* (2012.01)
*G08G 1/00* (2006.01)

(52) U.S. Cl.
CPC *G07C 5/00* (2013.01); *G06Q 10/04* (2013.01); *G06Q 10/06* (2013.01); *G06Q 50/30* (2013.01); *G08G 1/20* (2013.01)

(58) Field of Classification Search
CPC ............ G07C 5/00; G07C 5/006; G07C 5/04; G07C 5/10
USPC .......................................................... 701/29
See application file for complete search history.

(56) References Cited

U.S. PATENT DOCUMENTS

| 5,531,122 | A  | * | 7/1996 | Chatham et al. ................. 73/760 |
| 2004/0008253 | A1 | * | 1/2004 | Monroe ......................... 348/143 |
| 2006/0106582 | A1 | * | 5/2006 | Schmidt ........................ 702/189 |
| 2012/0150380 | A1 | * | 6/2012 | Whittaker ..................... 701/29.4 |

* cited by examiner

*Primary Examiner* — James Trammell
*Assistant Examiner* — Michael D Lang
(74) *Attorney, Agent, or Firm* — Dickinson Wright LLP; Matthew J. Marquardt; Eric D Lavers

(57) ABSTRACT

Systems, methods, devices, and computer programming products useful for the gathering and use of data relating to structural loading and other operational use of transit and other vehicles, and their systems. Systems according to the invention can, for example, comprise one or more data acquisition devices such as strain gauges, accelerometers, or other sensors; data processors; memories; and communications systems. Such systems, methods, and programming are useful in a wide variety of ways, including, for example, monitoring the structural status and use of vehicles and their systems, including fatigue other operational analyses; gathering and applying data useful in the maintenance of such vehicles and the routes they travel; monitoring the use/abuse of such vehicles by operators and other individuals; reporting traffic events or anomalies; and routing transit and other vehicles around such events or anomalies. Rainflow, level-crossing and other peak-counting or event-counting algorithms are applied to advantage, such that required data storage is greatly reduced, and life-long monitoring is feasible.

26 Claims, 5 Drawing Sheets

SYSTEM AND METHOD FOR MONITORING OPERATION OF VEHICLES

CROSS REFERENCE TO RELATED APPLICATIONS

This application claims the benefit of, and by this reference incorporates the entirety of, U.S. Provisional Patent Application Ser. No. 61/143,325, filed 8 Jan. 2009 and entitled STRUCTURAL FATIGUE DATA LOGGER; and co-pending U.S. patent application Ser. No. 12/651,655, filed 4 Jan. 2010 and entitled SYSTEM AND METHOD FOR MONITORING OPERATION OF A VEHICLE.

FIELD OF INVENTION

The present application relates to systems, methods, and computer programming structures and products useful for monitoring structural loading and/or performance of engines and other systems in vehicles, and particularly in buses and other public transit vehicles, and for using data so monitored.

BACKGROUND OF THE INVENTION

Currently, public transit vehicle manufacturers use finite element analysis (FEA) and road testing to verify the structural integrity of their vehicles during the design and testing phases of vehicle development. However, such testing does not always accurately reflect the conditions actually encountered by particular vehicles in service. For example, one major unknown factor in structural design integrity is the conditions of the streets on the routes actually taken by any given bus(es) in service.

Sometimes, vehicles are driven over test routes intended to simulate service conditions. Such vehicles may be instrumented with strain gauges at critical joints, and driven on "typical" transit, commuter, or other routes, so that allegedly representative data may be gathered and analysed. One concern is whether the chosen test site, route and driving conditions are in fact representative of the operating environments to be experienced by all relevant individual vehicles in service. Also, data can be skewed by such factors as the time of year, the individual driver(s) used to conduct the test, and whether or not a test route has been recently resurfaced or otherwise maintained, or is nearing the end of its useful life. As a result, simulation of real-life duty cycles by the best available and most sophisticated techniques can be in error by wide margins (for example, 50%-100%, or more).

SUMMARY

The invention provides systems, methods, devices, and computer programming products useful for the gathering and use of data relating to structural loading and/or performance of engines and other systems in transit and other vehicles. Systems according to the invention can, for example, comprise one or more data acquisition devices, such as strain gauges, accelerometers, thermocouples, and/or other transducers, and suitably-configured data processors, memories, and communications systems.

Systems, devices, and programming products in accordance with the invention are useful in a wide variety of ways, including, for example, monitoring the structural status of and systems performance within vehicles, including tracking of structural damage and fatigue issues and/or use and/or performance of engine, air conditioning or other environmental control, and other systems; gathering and applying data useful in the maintenance and/operation of such vehicles and the roads, tracks, and/or other routes or paths they travel; monitoring the use/abuse of such vehicles by operators and other individuals; reporting traffic events or anomalies; and routing transit and other vehicles around such events or anomalies.

For example, one of the many advantages offered by the invention is its use in the maintenance and operation of fleets of service vehicles, such as buses, trains, and other public transit vehicles, based on actual, in-service data collected and optionally reported to central or remote operating systems, such as servers operated by transit operators, maintenance facilities, and/or traffic management or law enforcement agencies.

Data collected from the use of test vehicles in test conditions is in many cases not representative of the actual operating conditions encountered by specific vehicles in the field, which conditions are of greatest interest in monitoring and controlling fleet operations and management processes. Collecting data from vehicles in the field (i.e., in service) can allow the operating conditions of specific individual vehicles to be recorded, and the effect of the conditions on such vehicles to be processed and considered either at leisure or in real time. This may also allow for data from specific transit routes, or associated with individual operators (e.g., drivers) of transit vehicles to be collected and analysed, and maintenance, repair, and/or corrective action to be scheduled and conducted.

In one aspect, the invention provides devices attachable to or otherwise installable in transit and other vehicles and useful for acquiring data related to the structural loading or other operational aspects of transit or other vehicles. Such a device may comprise one or more sensors configured for sensing shocks, temperatures, pressures, humidities, impacts, vibrations, speed, torque and/or other structural events, or other operational conditions or parameters, experienced by or associated with the vehicle, and/or the structural or other system response of the vehicle thereto, and for providing corresponding output signals; one or more data processors configured for processing said output signals to generate data useful in determining response of the vehicle to such structural events; and memory usable by the data processor(s) for storing the data useful in determining structural response of the vehicle. Signals generated by such sensors may be processed by the one or more data processors, and/or by other data processors, for analyzing the structural loading and/or response of such vehicles or systems to structural or operational events experienced by the vehicle(s). For example, signals corresponding to accelerations and/or strains experienced by the vehicles may be used in determining the effect of such structural events on the fatigue life of the vehicles, or portions thereof, and/or for assessing or investigating damage to the vehicle(s) or the possibility thereof. As a further example, engine or air-conditioning system parameters such as temperature(s), humidities, pressure(s), rotational speeds (RPMs), torques, etc., may be measured and used in determining the status or operational history of such engines, environmental control systems, etc. In analyzing acquired signals to make such determinations, rain-flow and other peak-counting or level-crossing algorithms may be advantageously employed.

In a further aspect, the invention provides systems useful for acquiring data related to the structural loading and/or response of transit vehicle(s). Such a system can be installable in a transit or other vehicle, and may comprise a plurality of data acquisition devices, including data acquisition devices of the type described above; one or more data processor(s); on-board data communication system(s); on-board memory(ies) accessible by the at least one data processor, and useful for storing acquired and/or processed data. Each of the plurality of data acquisition devices can comprise one or more sensors configured for sensing shocks, temperatures, humidities, pressures, torques, rotational speeds, impacts, vibrations, and/or other structural events experienced by the vehicle or various components of its engine or other systems, and/or the structural or other response of the vehicle or its systems thereto, and for providing corresponding output signals. The data processor(s) can be configured for processing the output signals in order to generate data useful in determining the structural response of the vehicle to such structural events, and to store data so generated in the memory accessible by the at least one data processor. The on-board data communication system(s) can be configured for communication of output signals and data useful in determining such structural or other response(s) between the plurality of data acquisition devices, the central data processor device(s), and the memory(ies) usable by data processor(s).

For example, in various embodiments such aspect(s) of the invention can provide systems useable for acquiring data related to structural loading (or response) or other operational conditions or parameters of transit or other vehicles, such systems being installable in such vehicles and each comprising a plurality of data acquisition devices, at least one controller, and an on-board data communication system. Each of the data acquisition devices in such embodiments can include one or more accelerometers, strain gauges, temperature gauges, hygrometers, pressure gauges, tachometers, torque sensors, and/or other sensors configured for sensing structural or other operational events or conditions experienced by the vehicle, and for providing corresponding output signals, and one or more data processors configured for using such output signals to generate data useful in determining structural response of the vehicle to such structural events. The memory(ies) can be usable by such processor(s) and/or the controller(s) for storing the data useful in determining structural response of the vehicle. In such embodiments the controller(s) can be configured to control at least one of acquisition, processing, and storage of the data useful in determining structural response or other of the vehicle. The on-board data communication system can be configured for communication of the data useful in determining structural or other response of the vehicle between the plurality of data acquisition devices and the controller.

Such systems can further comprise data input/output ports, which may be wired or wireless and configured for communicating any of the data acquired and/or processed by the systems to external maintenance or diagnostic tool, and or to remote data processing systems such as servers operated by fleet operators, maintenance services, or traffic authorities.

In further aspects, the invention provides systems, methods, devices, and computer programming products for using data so acquired, processed, and or stored. For example, the invention provides systems, methods, and programming products for scheduling repair and/or maintenance of vehicles, vehicular systems, and/or transit paths such as roadways, rails, and/or other tracks. For example, methods according to such aspects of the invention may be performed by on-board and/or remote data processors, and may include receiving signals representing data generated aboard at least one transit vehicle, the signals useful for determining the structural location(s) within the vehicle affected by a structural event; determining the location of the structural event experienced by the vehicle on a path traveled by the vehicle (i.e., the geographic location); and, using the determined location(s), generating signals useful for scheduling a path repair or maintenance activity to be conducted at the determined location.

As a further example, the invention provides systems, methods, devices, and computer programming products for scheduling repair and/or maintenance of transit vehicles. Systems, methods, and programming product according to such aspects of the invention may be implemented using on-board and/or remote data processors. Such methods may include receiving signals representing data generated aboard at least one transit vehicle, the data generated using signals provided by one or more sensors attached to the vehicle in response to structural or other operational events or conditions experienced by the vehicle or any of its systems; using the received signals, generating signals useful for scheduling repair or maintenance activities to be performed on the vehicle; and outputting the generated signals useful for scheduling repair or maintenance activities to be performed on the vehicle in a form useful in performing the repair or maintenance activity.

As a further example, the invention provides systems, methods, devices, and computer programming products for scheduling repair and/or maintenance of transit vehicles. Methods according to such aspects of the invention may be performed by on-board and/or remote data processors, and may include receiving signals representing data generated aboard at least one transit vehicle, the signals useful for determining the time and location of the structural or other event experienced by the vehicle on a path traveled by the vehicle; and using signals representing the determined time and location to generate signals useful for creating a report pertaining the performance of an operator of the vehicle at the time and location of the structural event.

As a further example, the invention provides systems, methods, devices, and computer programming products useful for routing transit vehicles. Methods according to such aspects of the invention may be performed by on-board and/or remote data processors, and may include receiving signals representing data generated aboard at least one transit vehicle, the signals useful for determining the time and location of the traffic event experienced by the vehicle on a path traveled by the vehicle; and using the stored signals representing the determined time and location to generate signals useful for routing the same or other transit vehicles to avoid the traffic event.

As further examples, the invention provides systems, methods, devices, and computer programming products use for acquiring and processing data related to the operation of engines, environmental control, and other systems of vehicles, such devices, systems, methods and programming products useful for generating, processing, storing, and communicating signals useful in recording, and analyzing the operational histories of such systems.

As will become plain to those skilled in the relevant arts, as they become familiar with this disclosure, systems, methods, devices, and computer programming products useful for making fatigue and other structural assessments of vehicles; for assessing the effects (including damaging effects) of various routes on various specific vehicles or types of vehicles; and for monitoring the performance of drivers and other vehicle operators; for identifying and locating construction sites and other traffic anomalies (or events), so that vehicle routes can be changed and/or roads or other paths can be fixed. In particular, for example, a transit agency can provide data to city planners/maintenance personnel on the need for road repair. Drivers can be instructed to take appropriate action, as for example to slow down on bad roads; and route times can be adjusted. Vehicles can be caused to last longer, as significant damage events can be eliminated. Various correlations of damage between drivers, routes, time of days, season, etc., can be understood, and corrective or improving action(s) taken.

BRIEF DESCRIPTION OF THE DRAWINGS

Reference will now be made, by way of example, to the accompanying drawings which show example embodiments of subject matter disclosed herein, and in which.

Similar reference numerals may have been used in different figures to denote similar components.

DESCRIPTION OF EXAMPLE EMBODIMENTS

Figure 1:
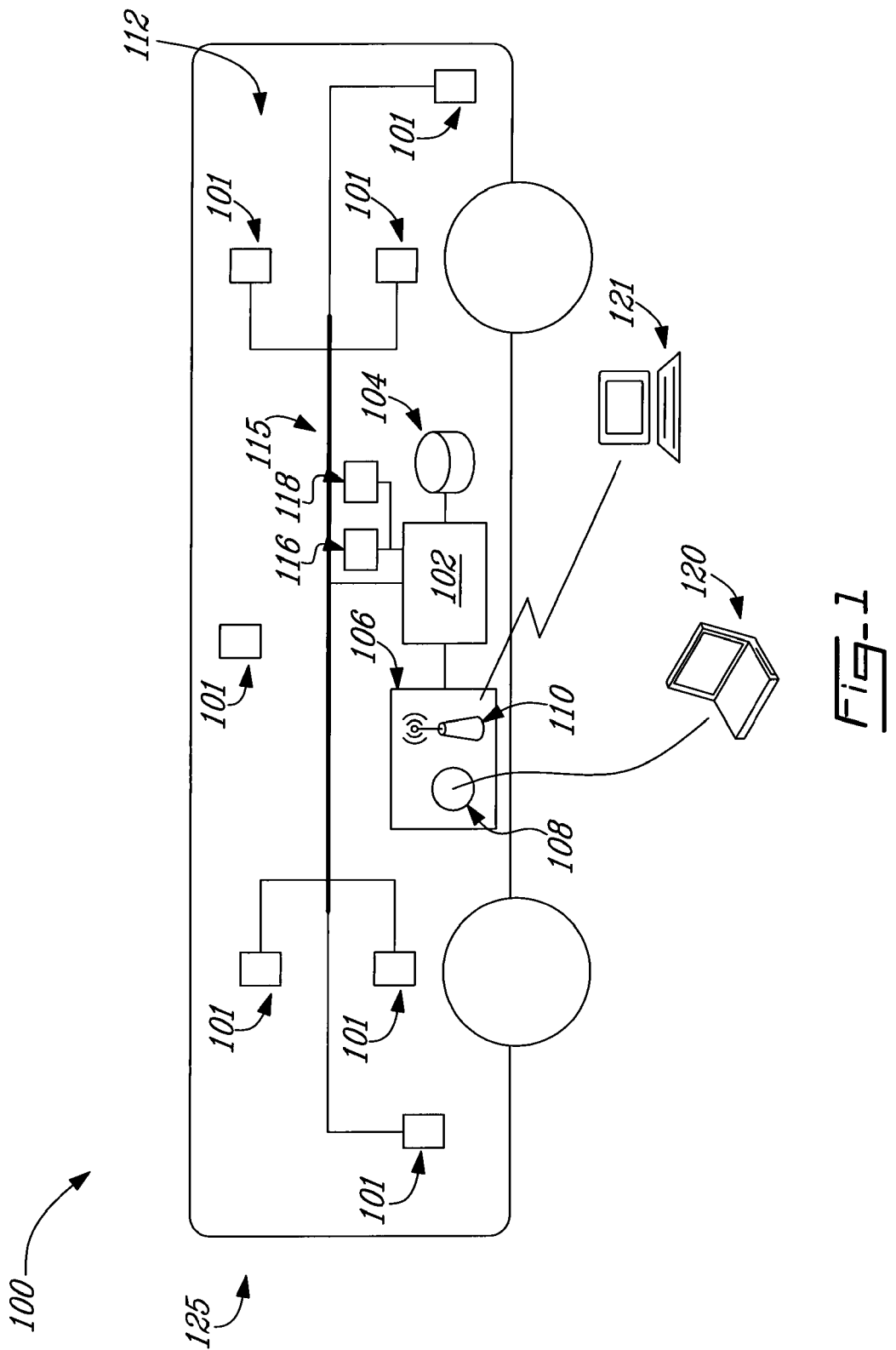
FIG. 1 shows a schematic diagram of an example system for gathering data relating to the structural loading or other operational conditions of a vehicle in accordance with the disclosure herein.

FIG. 1 shows, in block diagram form, an example of a system 100 for gathering data relating to the structural loading or other operational condition(s) of a transit or other vehicle in accordance with the invention. In the embodiment shown, system 100 is installed in a vehicle 125 and is adapted to interact with one or more diagnostic/maintenance tools 120,121 through, for example, the exchange of various command and data signals. System 100 comprises a data acquisition system 112 which, in the embodiment shown, includes one or more on-board (or "central") system controllers 102, memory(ies) 104, data bus(es) 115, input/output component(s) 106, and one or more data acquisition devices 101 which may be attached or attachable to various portions and/or or systems of the vehicle 125.

Data acquisition device(s) 101 may be configured to gather, and process, communicate, and/or store, data relating to the structural loading or other operational condition(s) of a vehicle 125 to which they are attached, or within which they are otherwise installed. In particular, such devices may be attached to stringers, ribs, plates, beams, sheets, or other structural components, and configured to acquire, process, communicate, and/or store signals and data related to the structural loading(s) of such vehicles caused by various forms of structural events, which can include any events of whatever type that cause vehicles and their structural components to experience loadings which could cause or contribute to any form of structural damage, including for example fatigue, inelastic deformations, and/or any types of fracture, rupture, or other failure. Such events might include, for example, the striking by a vehicle or any of its components of one or more potholes in a road, discontinuities in a rail, impacts of or by curbs, vehicles, or other objects, weather, etc., and/or vibrations of any type or source. Such devices may also be attached to or installed with engines, environmental control, and/or other system(s) of such vehicles, and configured to acquire, process, communicate and/or store temperature, humidity, pressure, torque, rotational, and/or other operation conditions of such system(s).

In various embodiments, various forms of structural loading may be measured indirectly, as for example through the use of acceleration data acquired through one or more single- or multiple-axis accelerometers, and/or directly, as for example through the use of suitably-installed strain gauges. Once such gathered data has been processed as desired, it may be broadcast on data bus(es) 115 for use by other system components, including for example onboard (or "central") controller 102 and/or data store(s) 104. Details of data acquisition devices 101 are discussed in further detail with reference to FIG. 2. In the same and other embodiments, other vehicle operational conditions can be monitored using any suitable sensors, including for example temperature, pressure, and torque sensors, tachometers, etc.

Onboard or "central" controller(s) 102 may administer and/or otherwise control operations of data acquisition system 112, including any or all of data acquisition device(s) 101. Onboard controller(s) 102 may, for example, send control, query, and other types of signals to any or all of data acquisition devices 101 using data bus(s) 115. In some embodiments, controller(s) 102 may control collection of data gathered by data acquisition device(s) 101, via data bus(s) 115 for storage in memory(ies) 104. Single or multiple controllers may be provided in any desired centralized or distributed processing system. For example, multiple controllers 102 may be used, each single controller 102 being responsible for controlling communications with and between groups or subsets of data acquisition devices 101, or a single controller 102 may be used to control such communications with respect to all data acquisition devices 101.

Controller(s) 102 may further provide any desired data reduction, structural or other analysis functions, or other data processing, as well as internal and/or external communications control functions.

Controller(s) 102 can be provided using any suitable special- and/or general-purpose programming devices, including for example general-purpose data processing boards and/or specially-designed or configured circuits or circuit chips, adapted to execute any suitably-configured operating system(s) or other control-type software, which may include general-purpose data processing systems and/or special-purpose programming modules stored in memory(ies) accessible by the controller(s) 102, including for example any or all of memory(s) 104. As will be understood by those skilled in the relevant arts, a wide variety of suitable controlling languages or programming architectures are suitable for use in implementing these and other aspects of the invention.

Controller(s) 102 may also perform other functions in controlling, managing and/or monitoring operation of vehicle(s) 125. For example, controller(s) 102 may include or be included by general vehicle data processing systems used for climate or other environmental control, engine and/or fuel management functions, navigation, etc.

Memory(ies) 104 may comprise any suitable type(s) of volatile and/or persistent data storage devices such as, for example, RAMs, flash memory(ies) and/or EEPROM. In some embodiments, memory(ies) 104 may comprise, or utilize, existing on-board or remote data storage facilities not otherwise being fully used for program or communication execution, or for other purposes, such as unused memory registers in a multiplexing system of any one or more of bus(es) 115.

Data bus(es) 115 can comprise any suitable data communications systems, implementing any suitable communications schemes or protocols, including, for example, the SAE J1939 protocol.

Diagnostic/maintenance tools 120,121 may comprise any desired type(s) of computing/data processing device(s) capable of receiving, storing, and/or processing data provided by system 100, or otherwise related to structural loading or other operational conditions of vehicle(s) 125. For example, diagnostic/maintenance tools 120, 121 may include any special- or general-purpose desktop workstations, laptop computers, handheld devices, PDA's, or other device(s) suitable for use in implementing the systems and objects contemplated herein, including any desired data reduction, structural analysis, engine or environmental control system functions, or other data processing, including for example maintenance control or implementation functions, as well as internal and/or external communications control functions. Maintenance/diagnostic tools 120, 121 can, for example, cooperate with any controller(s) 102 in providing desired functionality suitable for use in implementing the objects disclosed herein.

Diagnostic/maintenance tools 120,121 may, for example, receive data collected or controlled by controller(s) 102 through input/output component(s) 106. In various embodiments input/output component 106(s) may, for example, comprise one or more wireless transmitters 110 which may be capable of transmitting/receiving information, such as structural loading data acquired using data acquisition device(s) 101 and/or stored in any memory(ies) 104, to/from the diagnostic/maintenance tools 120,121. Alternatively, input/output component 106 may comprise a physical port or socket 108 to which a diagnostic/maintenance tool 120 may be coupled through a connection such as, for example, a cable, wire or the like.

In some embodiments, diagnostic/maintenance tools 120, 121 may up/download command and/or data signals to data acquisition system 112 in order to, for example, set one or more parameters to be used by any or all of the device(s) 101, 102, 120, 121 in implementing and/or controlling processes according to the invention. For example, as is explained herein, processors associated with data acquisition devices 101 can implement various data sorting and storing techniques, including for example rain flow and other peak counting algorithms. Tools 120, 121 may be used to initiate or otherwise control the operation of such algorithms, including for example the setting of "bucket" ranges or values and other parameters as described herein, and/or to download, store, and/or process data collected, processed, or stored by any or all of devices 101, 102, 106 and other components of systems 100, 112.

System 100 may further include, or be communicatively linked to, any one or more of a wide variety of devices, including for example any one or more Global Positioning Systems (GPSs) 116 and/or a real-time or other clocks (RTCs) 118 for gathering information relating to the vehicle 125 for use, for example, in conjunction with data acquired by device(s) 101 in analyzing the condition, history, and/or environment of the vehicle 125, including for example correlating, reporting, etc., the time, date, and/or location of accidents, pothole strikes, incidents of vehicle abuse, etc. In such embodiments, for example, such devices may be used to record the time and/or location of the vehicle 125 when, for example, anomalous or otherwise significant events such as significant readings from one or more of the data acquisition devices 101 are recorded. System(s) 100 may also include memory(ies) storing, or otherwise acquire or provide access to, data representing other information, such as driver identification information (supplied, for example, through the use of driver-unique RFID tags), so that, for example, abusive events can be recorded and properly attributed for corrective action. For example, using wireless connections 110, controller(s) 102 and/or data acquired or stored by the devices 101 and/or various other components of system 100 may be communicatively linked to administrative data processing systems operated by an owner or operator of one or more vehicles 125 in which such systems and components are installed. For example, data relating to anomalous or abusive events related to the vehicle 125 and/or any of its components or passengers may be communicated to such remote data processors and/or storage devices for further investigation, such as described below in relation to FIG. 5.

Figure 2:
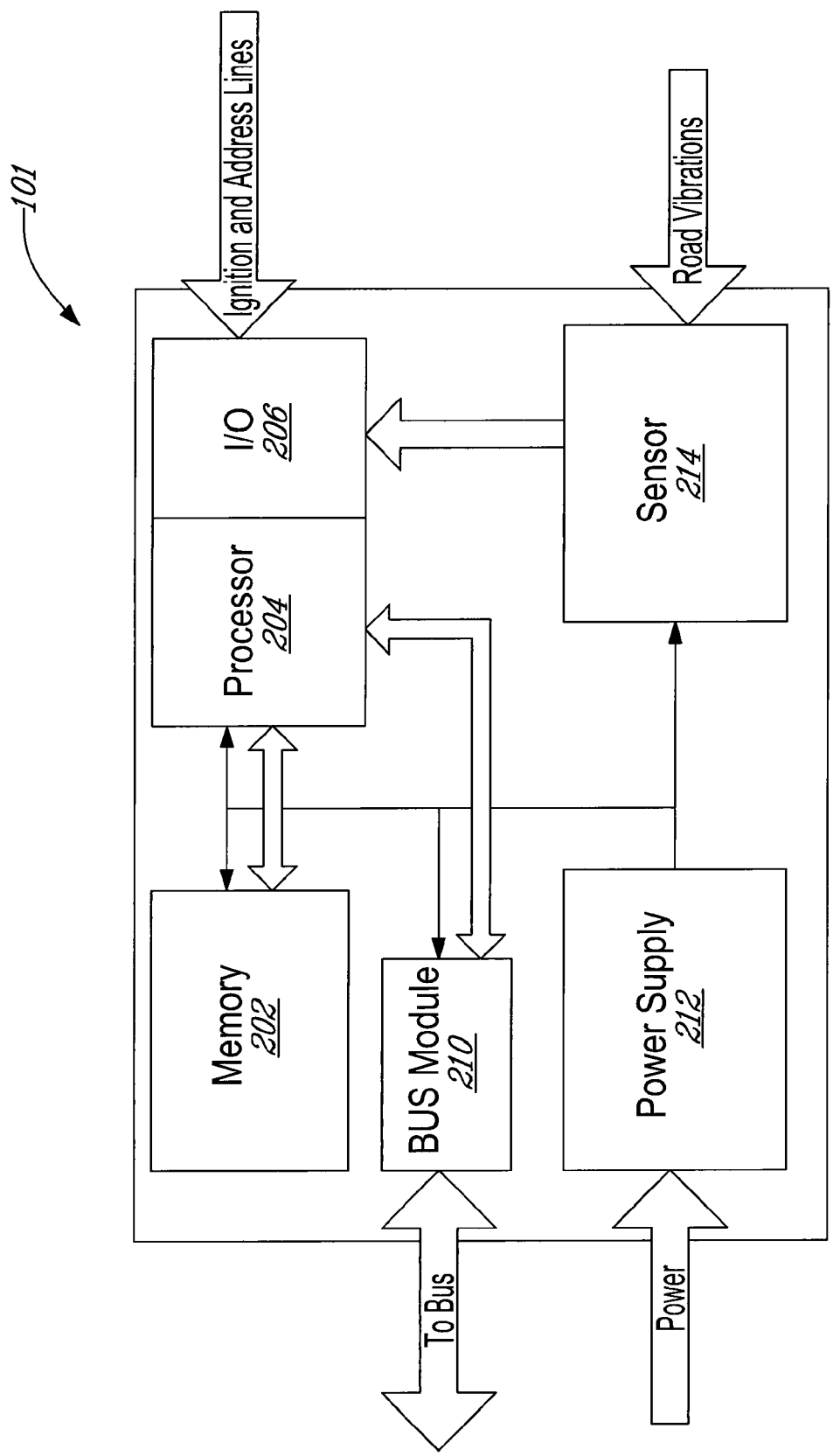
FIG. 2 shows a schematic diagram of an example data acquisition device suitable for use in implementing aspects of the disclosure herein.

FIG. 2 provides a schematic block diagram of an embodiment of a data acquisition device 101 suitable for use in implementing aspects of the systems and methods disclosed herein. A data acquisition device 101 may, for example, comprise one or more memory(ies) 202, processor(s) 204, input/output component(s) 206, bus module(s) 210, power supply(ies) 212, and/or sensor(s) 214 as desired to provide any functional objectives consistent with the disclosure herein.

Power supply(ies) 212 may provide electrical power to some or all of the various components of a device 101. In some embodiments, for example, power supply(ies) 212, may receive power from an external source, such as a power system provided for a vehicle 125, and/or from one or more vehicle or dedicated device batteries, together with any necessary or desired transformers, voltage regulators, surge protectors, capacitors, etc. In many commonly-used transit vehicles, for example, such systems and devices may be supported by a power supply comprising or supporting a 12V system, a 24V system, or both.

Sensor(s) 214 may comprise any type(s) of sensing component(s) capable of gathering necessary or desired data relating to the structural loading or other operational condition(s) of a vehicle. Data acquired by sensor(s) 214 may, for example, represent or otherwise relate to structural events such as vibrations, shocks, impacts, and/or other structural loadings caused by irregularities in roads, tracks, or other paths traveled by a vehicle, by equipment installed on or operated within a vehicle, or caused or induced by any other source(s); and/or engine, cabin, or other temperatures, pressures, humidities, operating speeds, torques, etc. In some embodiments, for example, any one or more sensor(s) 214 may comprise one or more single- or multiple-axis accelerometers configured to measure acceleration(s) of the vehicle in any desired direction. For example, an accelerometer may measure the positive and/or negative G-forces along a vertical ("Y") axis, a fore/aft ("X") axis, and/or a transverse ("Z") axis of the vehicle 125 (see FIG. 3). As will be readily understood by those skilled in the relevant arts, such accelerations can, using for example known methods, be correlated with stresses and strains imposed on one or more structural members of the vehicle 125. Thus device(s) 101 can be installed in any orientation on the vehicle such that sensors comprised thereby can measure any or all of vertical, horizontal, and/or lateral accelerations or accelerations along any desired axis(es) according to the orientation(s) in which they are installed.

In various embodiments it has been found to be advantageous to provide and install such devices so that they provide multiple sensors, oriented at right angles to each other, such that acceleration histograms in all 3 axis may be recorded.

In the same or other embodiments, data acquisition system 112 may comprise multiple accelerometers configured to respond differently under different loading conditions, including for example accelerometers of differing sensitivites and/or loading ranges. For example, a data acquisition system 112 may comprise one or more 3.0 g accelerometers for evaluating vehicle body accelerations and/or one or more 15 g accelerometers for evaluating accelerations at or close to a vehicle axle, in order, for example, to measure road- or track-induced input before a suspension system can soften the effect of shocks or impacts to the body.

In further embodiments, sensor(s) 214 may comprise one or more strain gauges (including for example one or more wheatstone bridges or other arrangements) for determining strains induced in various portions of the vehicle 125. Data collected by sensor(s) 214 may be in the form of digital and/or analog signals; thus data acquisition device(s) 101 can further include analog-digital and/or digital-analog signal or data converters, as well as amplifiers and/or other signal processing devices. As will be understood by those skilled in the relevant arts, sensors suitable for use in provided data acquisition devices include any devices capable of generating and modifying signals useful for detecting and/or monitoring structural events as disclosed herein, and particularly sensors useful for generating signals useful in determining structural loadings or responses associated with such events.

In further embodiments, sensor(s) 214 may comprise any instruments or devices suitable for providing signals representing any desired operating parameter of an engine, environmental control, or other system of a vehicle 125, installed in such a way as to most effectively acquire data representing such parameter(s).

Data gathered by sensor(s) 214 may be transmitted directly or indirectly to processor(s) 204. For example, as in the embodiment shown, such data may be routed to processor(s) 204 via input/output (I/O) component(s) 206, which may include components or modules such as the signal processing, amplifying, and/or other devices mentioned above. I/O component(s) 206 may also be configured to receive data signals communicated by other devices, including for example bus(es) 115 and/or any device(s) linked thereto. As an example, I/O device(s) 206 may be configured to receive via bus(es) 115 signals indicating that an ignition system of a vehicle 125 has been activated; such signals may, for example, be used to activate a device 101 and/or its various components, and cause it/them to begin recording data via sensor(s) 214.

In some embodiments, a vehicle ignition signal or other signal received by an input/output module 206 may be used to initialize, "wake up", or otherwise control a device 101, thus, for example, permitting power to flow to and processes to commence within the various components of the device 101. For example, an indication that the vehicle ignition is in an off state, such as the lack of an ignition signal communicated by a bus 115, may return data acquisition device 101 to an ultra low power state, sleep mode, or unpowered state. Loss of such a signal may cause various processes to be initiated by a processor 204 and/or other components of the device 101, including for example triggering of storage of data acquired by sensor(s) 214 in one or more memory(ies) 202 and/or broadcasting or other communication of data on data bus 115 to other components of the systems 100, 120, 121.

I/O device(s) 206 can receive further types of data, and process them and/or forward them to processor(s) 204 and/or other components of the device 101 accordingly. For example address data received by input/output component 206 may comprise a harness address associated with the data acquisition device 101, to be used in relaying data to and receiving data from bus(es) 115. Such address data may comprise or be represented by one or more address lines or input pins which may be hard-wired to ground, and/or may comprise open circuits creating, for example, binary address codes useful for identifying the device address on a data bus 115. If multiple data acquisition devices 101 are used in a data acquisition system 112, harness addressing techniques can be used to distinguish between them. Harness addresses may, for example be read by I/O module(s) 206 at power-up, and used to determine a resource address associated with the data acquisition device 101 for use in communications with various other components of data acquisition system 112, etc.

Processor(s) 204 may format and/or otherwise process data signals acquired by sensor(s) 214, and control short- or long-term storage of such formatted and/or processed signals. In various embodiments, such processing may occur in real time, and/or may be delayed through storage of raw or other data in memory(ies) 202 for batch or other delayed processing. Data processing and measuring techniques employed by the data acquisition system 112 may include or facilitate application of algorithms such as conversion of input data to stresses, strains, and/or other structural loadings; temperatures, pressures, humidities, operating speeds (including rotational speeds), torques, or other parameters; application of rainflow or other peak-, event-counting, or level-crossing algorithms; and/or the correction, normalization, transposition, and/or calibration of data to account for offsets in device mounting, ambient, operational, geometric or other considerations. Rainflow counting algorithms are well-documented methods of peak counting well suited for use in fatigue assessment, that allow data sets of varying parameters such as stresses or accelerations to be reduced to simple counts of load or cycle reversals of single or multiple magnitudes. Level-crossing algorithms count the number of times specified data amplitudes are exceeded. Such techniques are useful in tracking over-heating, overspeed, power duty cycles, and other conditions, and are discussed in greater detail in relation to FIG. 4.

As will be understood by those skilled in the relevant arts, a duty cycle of a vehicle or a vehicle system is the history of loadings or other conditions experienced by the vehicle or system during a given period of time or a given set of operations, including, for example, power on, operation under various conditions in various environments, idle, power off, etc.

In various embodiments, processor(s) 204 may sample data from sensor(s) 214 at rates significantly higher than (for example, approximately ten times greater than) anticipated structural loading or response frequencies, such as anticipated vehicle suspension harmonic frequencies, or other anticipated operating conditions. Typical heavy duty vehicle suspension frequencies of interest, for example, are on the order of about 10 hz. Therefore, sample rates of, for example, approximately 100 hz may be used. For monitoring engine operating parameters such as temperatures, pressures, speeds, etc., it may be advantageous to use constant- or variable-rate sampling times.

Like other processor(s) and component(s) comprised by system 100, including for example controller(s) 102, processor(s) 204 may include any suitable type(s) of suitably-programmed general- or special purpose automatic data processors, including for example special-purpose integrated circuit boards or chips.

Data provided by sensor(s) 214 may be temporarily and/or permanently stored, before, during, and/or after processing by processor(s) 204, in memory(ies) 202; and/or such data may be transferred to bus module(s) 210 for broadcast on data bus(es) 115 for storage and/or processing by controller(s) 102 and/or other components of systems 100, 112. In various embodiments, for example, such data may be stored in memory(ies) 104 controlled by controller(s) 102, and/or processed directly by controller(s) 102, and/or such data may be downloaded directly to devices 120, 121 for processing. Thus, various processing techniques, which may be centralized or distributed, may be employed by data acquisition system 112 to allow the amount of data stored in memory(ies) 104, 202 to be reduced or minimized. It is possible to store raw and/or processed data provided by device(s) 101 indefinitely, particularly where, for example, processes such as the rainflow algorithm or other peak-counting processes or level-crossing processes are used and provide relatively small post-processing data sets. It is possible, for example, using systems and methods according to the invention, to store such data onboard or off the vehicle, in memory(ies) 202, 104, 522, etc., for the entire life of a vehicle, for use, for example, in ongoing maintenance and/or repair programs.

Memory(ies) 202 may include any type(s) of memory device(s), including for example EEPROMs, RAMs, flash memory(ies), CD and other read/write discs, and/or other storage devices, suitable for use in implementing the systems and processes described herein. Memory(ies) 202 may store data related to the structural loading of vehicle 125 as well as, for example, data representing control parameters for the data acquisition device(s) 101 and/or their various components, including for example sensor(s) 214. Such control parameters may include, for example, accelerometer tolerance and/or sensitivity settings, calibration settings, version numbers, bus addresses, and/or broadcast rates.

Bus module(s) 210 may comprise bi-directional chips (such as CAN Chips SN65HVD251D) configured to broadcast data received from processor(s) 204 on data bus 115 using, for example, SAE J1939 and/or other suitable formats or protocols. As mentioned above, broadcast data signal sets may include harness addresses identifying the data acquisition device(s) 101 from which such data sets originate. Bus module(s) 210 may further receive command or other signals from controller(s) 102 through data bus(es) 115. For example, a controller 102 may send a signal set to one or more data acquisition devices 101 to provide the device(s) 101 with initialization, calibration, or other data values to starting or other states (e.g. a zero state). In some circumstances, data may be imported to a data acquisition device 101 from a controller 102 for storage in memory(ies) 202. This may occur, for example, where a data acquisition device 101 has failed and a new data acquisition device 101 has been installed in data acquisition system 112 to replace it; data provided by a controller 102 in such conditions might enable such a replacement device 101 to fully assume the pre-existing condition of the device(s) 101 it replaces. Messages broadcast by central controller(s) 102 on data bus(es) 115 may include one or more addresses identifying one or more data acquisition devices 101 by which data was acquired, and/or other devices or components to which such data is addressed. Bus module(s) 210 may retrieve messages from the data bus 115 containing the address of the data acquisition device 101 to which it belongs.

Among the many advantages offered by the invention is the cost effectiveness of the design, manufacture, installation, operation, and maintenance of various systems and devices which may be used to implement it, particularly where modular design(s) are used. Such cost effectiveness makes it practical to install a plurality of data acquisition devices 101 and other components of the system 100 on a number or all of the vehicles 125 in a fleet. This may allow a more accurate picture of the fatigue history of the fleet and its constituent vehicles to be monitored, and to enhance vehicle, road, and other maintenance, repair, and other programs.

Figure 3:
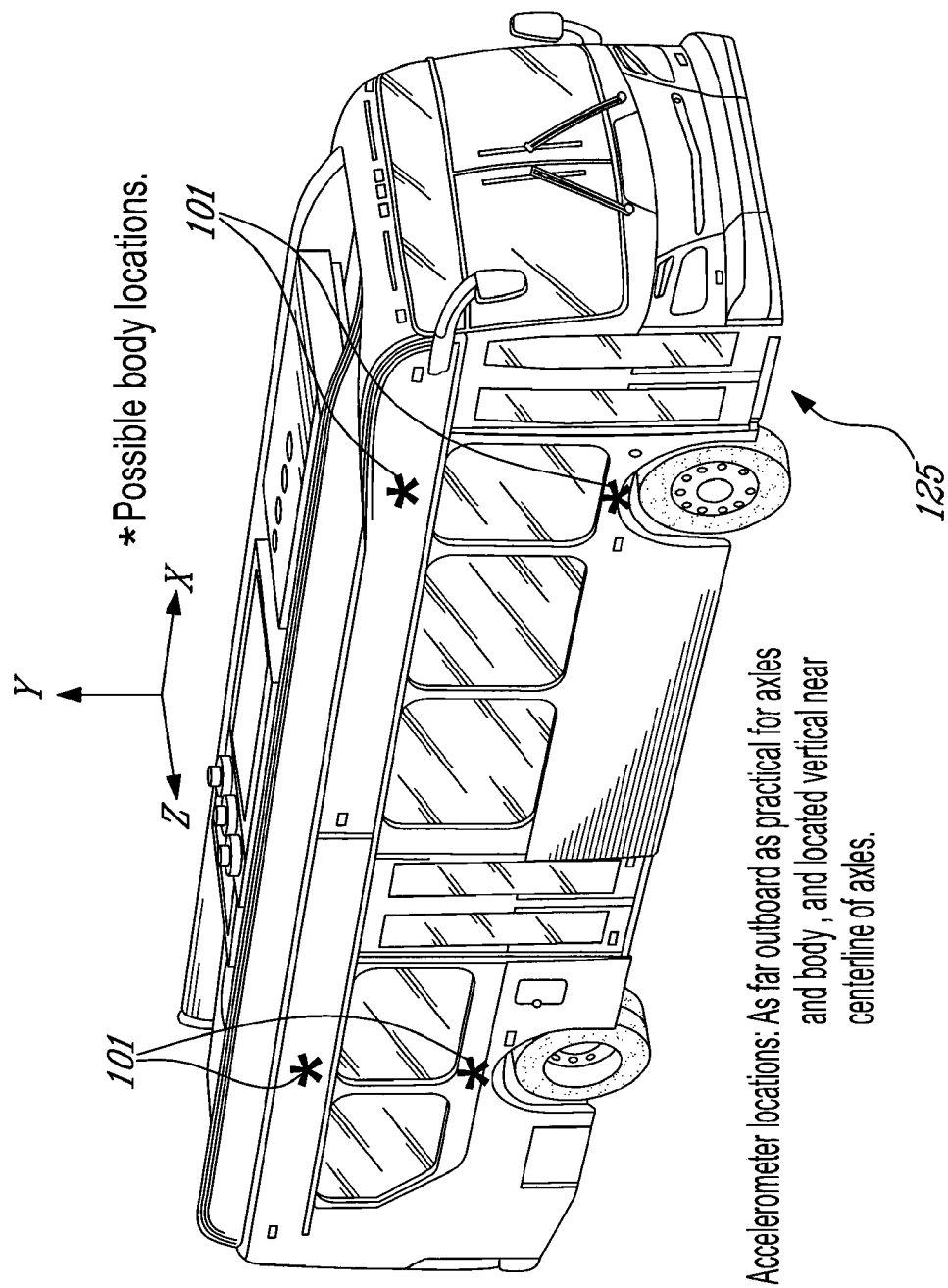
FIG. 3 shows a schematic diagram of exemplary installation locations for data acquisition devices in a vehicle in accordance with the invention.

FIG. 3 shows a schematic diagram of installation locations for a plurality of data acquisition devices 101 in an embodiment of a structure-monitoring system for a transit bus 125. As will be understood by those skilled in the relevant arts, once they have been made familiar with this disclosure, a wide variety of installation locations will be suitable for use in implementing any specific embodiment(s) of the invention, depending upon the nature and structure or other system(s) of the vehicle to be monitored, the goal(s) to be achieved through use of monitored data, the type and nature of the components of system 100 used, the nature of the routes to be traveled by the vehicle(s) in which the devices are installed, and other factors. For example, in some embodiments, data may advantageously be acquired by positioning one or more data acquisition devices 101 in or above the wheel hollows of vehicle 125, at one or more places on a wheel or axle structure of such a vehicle, in order to obtain readings corresponding to shocks or other loadings undamped by a vehicle suspension system, etc.; or on or along beams, stringers, ribs, or other major structural members; or on any structure(s) that are critical or otherwise of interest; or in or proximate to various engine and/or environmental control system components, such as air inlets, exhausts, cylinders, coolant systems, pumps, fans, etc. As will further be understood by those skilled in the relevant arts, in many embodiments it may be advantageous to use symmetrical installations, so that portions of the vehicle not shown in FIG. 3 might contain a plurality of similarly-located data acquisition devices 124.

Figure 4:
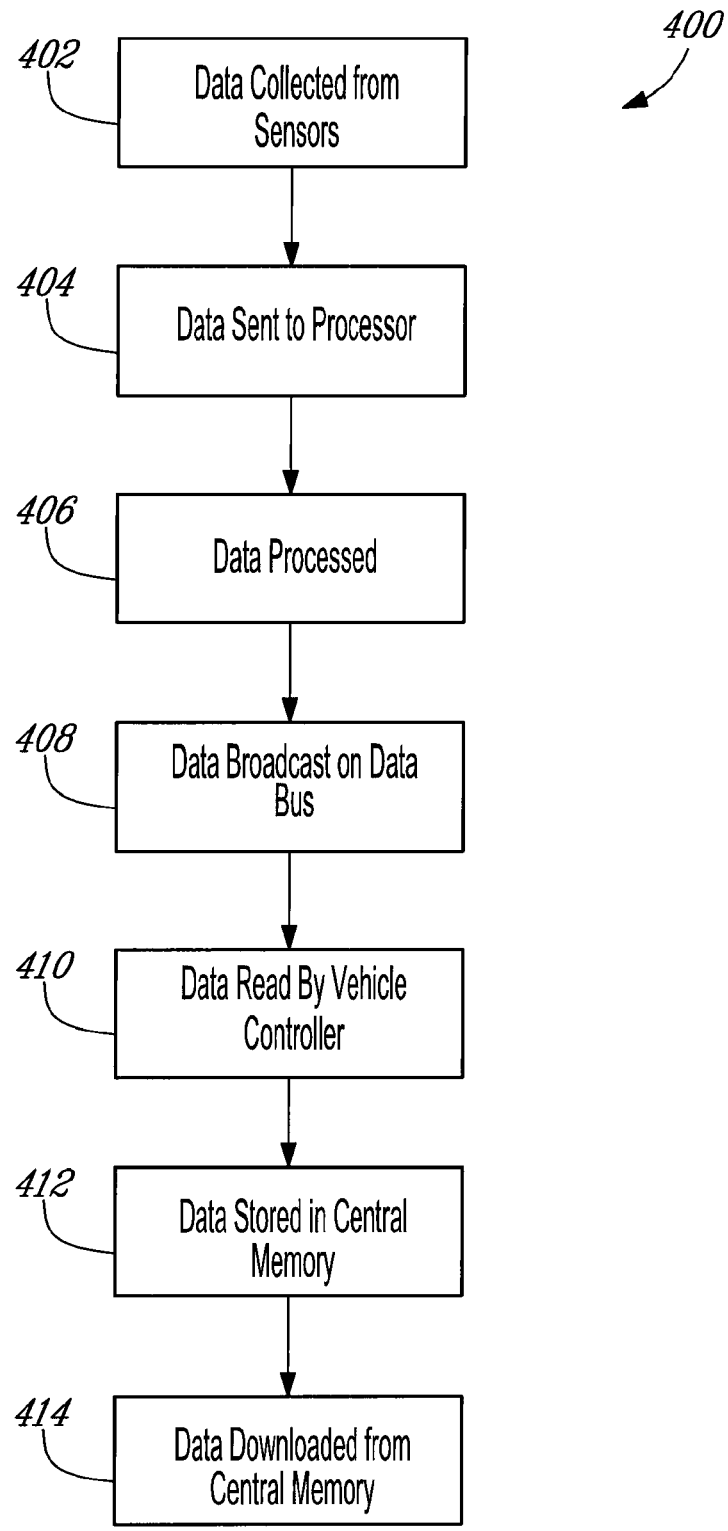
FIG. 4 shows a schematic flow diagram of an example of a method of gathering data relating to the structural loading or other operational condition of a vehicle in accordance with the disclosure herein.

FIG. 4 shows a schematic flow diagram of an example of a method of gathering data relating to the structural loading or other operating condition of a vehicle in accordance with the disclosure herein. Method 400 is suitable for use, for example, in conjunction with data acquisition system 100 of FIG. 1 and data acquisition device 101 of FIG. 2, installed in a vehicle 125 such as that shown in FIGS. 1 and 3.

Process 400 can be considered to begin at block or step 402 with acquisition of data signals by one or more sensor(s) 214. For example, if a sensor 214 comprises an accelerometer, output signals from the accelerometer may represent accelerations experienced by portions of the vehicle 125 in the region of the sensor(s) 214. Where, as a further example, the sensor(s) comprise one or more strain gauges, changes in resistance of any of the strain gauges may be correlated to changes in the strain, and/or stress, experienced by portions of the vehicle 125 within a given proximity of the strain gauge—that is, such data may represent a measurement of the current strain in such structures. If data collected by sensor(s) 214 is in analog form, as might be the case where, for example, output of a strain gauge is used, such data may be converted by the device 101 or any suitable one of its components, into digital data suitable for transmission on a vehicle bus 115 and/or for storage within any or all of memory(ies) 202.

At 404, acquired data is transmitted to processor(s) 204, and at 406 any desired data reduction and/or analysis algorithms are applied. For example, any analog output signals from sensor(s) 214 may be converted to digital data representing accelerations, stresses, temperatures, pressures, etc., in any desired coordinate systems or physical units, such as g's, pounds per square inch, degrees, RPMs, etc. They may also be subjected to various threshold recording requirements, whereby only events of at least (or at most) pre-defined magnitudes are recorded, and/or may be processed according to rainflow, level-crossing or other peak or event counting algorithms.

In, for example, embodiments employing rainflow or other peak- or level-counting techniques for reducing or otherwise controlling data to be recorded, a data acquisition device 101 may capture selected data and group it into various data "buckets." As will be understood by those skilled in the relevant arts, the rainflow-counting algorithm is a peak-counting algorithm used in the analysis of fatigue, in order to reduce a spectrum of varying stresses, into a set of simple peak reversals, allowing the application of Miner's rule or other algorithms in order to assess the fatigue life or other operational history of a structure subject to complex loading while significantly reducing the amount of data required to be stored for Miner's rule or other analyses. An example of application of the algorithm is to:

1. Define one or more loading levels (e.g., tensile, shear, and/or compressive stresses) of interest within a given range detectable by corresponding sensor(s)
2. Monitor sensor data
3. Reduce the time history of sensor data to data representing loadings indicating a sequence of (e.g., tensile) peaks and (e.g., compressive) troughs.
4. Count the number of half-cycles in the loading history.
5. Assign a magnitude to each half-cycle equal to the loading difference between its start and termination.
6. Pair up half-cycles of identical magnitude (but opposite sense) and count the number of complete cycles by, for example, incrementing a counter corresponding to instances of cycles of the corresponding defined loading levels. Typically, there are some residual half-cycles.

For example, a processor 204 of a data acquisition device 101 can count and store the number of acceleration reversals recorded by a sensor 214 that peak at or between selected values within a certain range of values (such as between 2 g and 2.25 g or other ranges, in the case of accelerometer readings, in desired increments or steps) and increment a counter in a corresponding "bucket," or stored array value, maintained in memory(ies) 202 and associated with a given magnitude or range of magnitudes of accelerations, accordingly. Data collected from a sensor 214 can, for example, be used to increment stored counts in ranges such as those specified Table 1.

Table 1 shows both a 3.0 g accelerometer option and a 15 g accelerometer option. For the 15 g option, the table has been adjusted so that both the more- and less-sensitive accelerometer readings are counted into equal numbers of acceleration ranges, or buckets. For example, for each sensor of a device 101 a separate array can be initialized in a matrix or other data structure in a memory 202. Each array can comprise a number of variables or "buckets", corresponding to number of discrete loading levels to be monitored using the sensor. In the example shown in Table 1, for example, a matrix of two columns and 26 rows may be initialized in a memory 202 of a device 101. The two columns may correspond to the two sensitivity settings (3.0 g and 15.0 g), while the 26 rows correspond to the respective peak ranges or increments. Each of the 2×26 matrix/array values may be referred to as a "bucket."

Values shown in Table 1 have been offset to account for acceleration due to gravity (i.e., to subtract a constant 1 g vertical acceleration due to gravity), such that a stationary sensor will be identified as having reading 0 g.

The collective data stored in the array buckets can be considered to represent a histogram of the counts of all ranges of the accelerations the device 101 is exposed to over time.

TABLE 1

| | 3.0 g Option | | 15.0 g Option | |
| --- | --- | --- | --- | --- |
| Bucket | Start (g) | End (g) | Start (g) | End (g) |
| 1 | <−3.00 | −3.00 | <−15.00 | −15.00 |
| 2 | −2.99 | −2.75 | −14.99 | −13.75 |
| 3 | −2.74 | −2.50 | −13.74 | −12.50 |
| 4 | −2.49 | −2.25 | −12.49 | −11.25 |
| 5 | −2.24 | −2.00 | −11.24 | −10.00 |
| 6 | −1.99 | −1.75 | −9.99 | −8.75 |
| 7 | −1.74 | −1.50 | −8.74 | −7.50 |
| 8 | −1.49 | −1.25 | −7.49 | −6.25 |
| 9 | −1.24 | −1.00 | −6.24 | −5.00 |
| 10 | −0.99 | −0.75 | −4.99 | −3.75 |
| 11 | −0.74 | −0.50 | −3.74 | −2.50 |
| 12 | −0.49 | −0.25 | −2.49 | −1.25 |
| 13 | −0.24 | 0 | −1.24 | 0.00 |
| 14 | 0.01 | 0.24 | 0.01 | 1.24 |
| 15 | 0.25 | 0.49 | 1.25 | 2.49 |
| 16 | 0.50 | 0.74 | 2.50 | 3.74 |
| 17 | 0.75 | 0.99 | 3.75 | 4.99 |
| 18 | 1.00 | 1.24 | 5.00 | 6.24 |
| 19 | 1.25 | 1.49 | 6.25 | 7.49 |
| 20 | 1.50 | 1.74 | 7.50 | 8.74 |
| 21 | 1.75 | 1.99 | 8.75 | 9.99 |
| 22 | 2.00 | 2.24 | 10.00 | 11.24 |
| 23 | 2.25 | 2.49 | 11.25 | 12.49 |
| 24 | 2.50 | 2.74 | 12.50 | 13.74 |
| 25 | 2.75 | 2.99 | 13.75 | 14.99 |
| 26 | 3.00 | >3.00 | 15.00 | >15.00 |

Thus in implementing such an algorithm processor(s) 204 can increment and record data in different buckets (i.e., array positions) of memory(ies) 202, 104 when reversals of more than various predefined magnitudes are recorded. Processor(s) 204 can, for example, monitor data acquired by the sensor(s) 214 and log reversals in the data to identify peaks of acceleration, strain, or other signals and, upon recording changes in such data in the same direction (i.e., reversals of less than a given magnitude), retain or log no data. When the acquired data changes direction by at least a predefined threshold (for example, 0.1 g, as determined by testing, may be adequate to eliminate nuisance background noise, such as engine vibrations, from the data), then the processor(s) 204 may assume that a peak has occurred and record the occurrence of an event of the corresponding magnitude by incrementing a counter in the stored array bucket.

In the example shown in Table 1, for example, a peak reading of 2.15 g by the 3.0 g accelerometer would be counted into and stored in a "bucket" or array row value 22 of a storage array associated with the 3.0 g accelerometer. A peak reading of 10.07 g by the 15 g accelerometer would be counted into and stored in a bucket 22 of a storage array associated with the 15 g accelerometer.

As will be appreciated by those skilled in the relevant arts, once they have been made familiar with this disclosure, one of many advantages offered by the invention is the efficiency offered by the use of such algorithms and processing for acquiring, processing, and storing structural loading data, and in particular data related to fatigue analysis and fatigue life of vehicle structures.

Those familiar in the relevant arts will further understand the implementation of such systems for the monitoring of temperatures, etc., in monitoring the use or operational histories of engines, etc. In such cases separate "bucket" values can be defined to correspond to various level-crossings of temperatures, pressures, humidities, operating speeds, etc.

In systems implemented according to various forms of the prior art, immense amounts of test data are recorded: each individual sensor reading is recorded, and stored, indefinitely.

Over the life of a vehicle, this can mean that the number N of recorded structural loading data points is equal to:

$$N = (\text{frequency of recordation}) \times (\text{number of sensors}) \times (\text{time of recordation})$$

In order to ensure that peak loadings are not missed and that useful analyses are conducted, for most transit-type vehicles, data is recorded at something like ten times the harmonic or other frequencies of interest for relevant portions of the vehicle structure or variations in other system(s) variables. In many such vehicles, as noted above, harmonic or other frequencies of interest are on the order of 10 hertz. Thus data is commonly recorded for each sensor at approximately 100 hertz, and maintained for the entire life of the vehicle. Thus, for a vehicle fitted with 12 sensors (four three-axis accelerometers, for example), a typical amount of data to be recorded, and saved, over the lifetime of the vehicle is:

$$N = (100 \text{ hertz})*(12 \text{ sensors})*(3600 \text{ sec/hr})*(20 \text{ hrs/day})*(365 \text{ days/yr})*(15 \text{ years})$$

$$N = 4.73*10^{11} \text{ items}$$

This data must then be processed and analyzed, generally, off-board the vehicle by one or more of systems 120, 121, 520 to obtain useful information regarding the structural response and loading of the vehicle.

In systems implemented according to the disclosure herein, using rainflow or other peak-counting or event-counting methods, relevant information can be described, and saved not only on board the vehicle but in the memory(ies) 202 of each of the relevant data acquisition devices 101, using:

$$N = (\text{number of sensors}) \times (\text{number of buckets}) \text{ items}$$

For the example of above, this would mean:

$$N = 12 \times 26 = 312 \text{ items}$$

of data must be stored. The remaining data need not be stored or retained.

Such savings in the amount of retained data can, for example, be achieved by acquiring data using one or more sensors 214; using processor(s) 204, making the comparisons described above to identify peaks/troughs or level crossings of given magnitude(s); and storing relevant data in array addresses, or "buckets", as described above. Streamed data provided by sensor(s) 214 can be processed in real time, and/or held in a suitably-sized and -configured buffer while the rain flow or other peak counting algorithm is applied. Thereafter only the peak/trough counts incremented in the corresponding buckets need be retained. As will be appreciated by those skilled in the relevant arts, this means that, by, for example, applying a Miner's rule or other fatigue, temperature, pressure, etc., analysis, a complete picture of the fatigue life of a structure or other relevant operational history of a system can be provided at any time, using only the small amounts of data stored in the rain flow/bucket array.

Tolerance, peak, or other threshold values used in defining buckets or array variables for recording data using such algorithms may be programmable, such that a user of a controller 102, 120, 121, 520 may cause them to be defined upon initialization of the system 100 or individual devices 101 (i.e., during the ignition process for a vehicle 125), or at any time during operation of the system 100 or the vehicle 125. Such values may be used in order to control data acquisition using desired sensitivity levels of corresponding sensors, etc.

Data processed by processor(s) 204 according to such algorithms may be stored in arrays or other suitable data structures in memory(ies) 202. A given amount of memory space (such as, for example, two gigabytes or any other suitable value) may be reserved in a buffer in memory a 202 for streamed data recorded by each sensor 214 until it has been processed as described above.

In various embodiments, as suggested above, accelerometers or other sensors 214 can be sampled continuously, or at any desired frequencies or intervals, constant or variable. For example, they may be sampled at periods of every 5 ms or other suitable interval.

In various embodiments, at power up, or any other desired or convenient time, each of the bucket counts of memory(ies) 202 can be reset to zero. Alternatively, counts may be maintained indefinitely, or may continue to increment until a predetermined event occurs, such as power to the device or the device itself being removed or uninstalled. As will be understood by those skilled in the relevant arts, the period or number of operating or other cycles for which data is maintained by memory(ies) 202 can be set according to any desired parameters, including vehicle design, maintenance, or monitoring cycles or schedules. As described above, a particular advantage offered by the use of rain flow or other peak-counting algorithms is that a very compact, efficient data set indicative of a cumulative fatigue history of any desired structure may be maintained over any desired interval, over any desired period of use.

At 408 recorded, processed, and/or other data stored in memory(ies) 202, which may for example include bucket rainflow count array data, may be sent by processor(s) 204 via bus component(s) 210 and bus(es) 115 or other desired network components to other components of system 100, including for example processor(s) or controller(s) 102, 120, 121, 520, and/or memory(ies) 104. This may be done periodically, at statically or dynamically determined intervals, or upon occurrence of some predetermined event. For example, the data may be relayed once per second or whenever one or more of the bucket counts has reached a certain level. In various embodiments, data may be sent to bus component 210 in response to a request from, for example, an on-board controller 102. Such data may then be broadcast on data bus(es) 115 by bus component(s) 210 along with address information for data acquisition device 101 received by input/output module 206.

At 410, bucket or other data may be read from data bus(es) 115 by onboard controller(s) 102 for up- or down-loading to further devices, e.g., processors 120, 121, 520 and/or for any further desired on-board processing. Where data broadcast on bus(es) 115 contains address information for the originating data acquisition device 101, onboard controller(s) 102 may keep track of the data acquisition device 101 from which each set of data originated and any or all of processors 120, 121, 520 can correlate such data to corresponding structural components of the vehicle(s) 125 and assess related structural issues. Controller(s) 102 may store the data taken from data bus(es) 115 in central or other on-board memory(ies) 104. Data from each of the one or more data acquisition devices 101 may be stored in separate data sets or, in some embodiments, the data received may be aggregated into a single rainflow data count matrix for all of the data acquisition devices 101.

Any further desired processing may also be conducted by any or all of controller(s) 102 or processor(s) 120, 121, 520. For example, if it has not already been so processed, data representing accelerations, strains, torques, temperatures, pressures, speeds, etc., may be converted into corresponding stresses, loadings, or other parameters, or may be transposed into any desired coordinate systems and/or physical units; correlated with corresponding structure(s) of vehicle(s) 125;

and/or any desired fatigue, damage tolerance, or other structural or other analyses may be wholly or partially conducted. Maintenance, repair, scheduling, reporting and/or other operations processes may also be conducted. Any desired raw or processed data may be stored in central memory(ies) 104.

At 414, data from central or other on-board memory(ies) 104 may be downloaded to or by (i.e., by push and/or pull technologies) diagnostic/maintenance tools 120, 121, 520 via, for example, I/O component(s) 106. For example, in various embodiments, data may be transferred wirelessly using wireless transmitter(s) 110. In the same or other embodiments, data may be downloaded by one or more diagnostic/maintenance tools 120, 121, 520 through physical port 108. Diagnostic/maintenance tools may perform any desired maintenance, repair, scheduling, reporting and/or other operations processes; such processes may be the same as, distinct from, and/or complement any processes conducted by any or all of processors/controllers 102, 204.

Thus it may be seen that in various embodiments the invention provides, for example, devices for measuring accelerations and providing analog signal output representing such accelerations, and processing the analog acceleration signal according to rainflow counting algorithm into a series buckets or data loggers, where each bucket represents a count of a specific pre-defined range of magnitude of acceleration, such that the collective data in all buckets can represent a histogram of the counts of all ranges of the accelerations the device is exposed to overtime. Such devices are also capable of storing post-rainflow-processed data for future retrieval, such that the acceleration related fatigue damage occurring over years of operations, may be stored in very small data storage volumes. Such devices are particularly useful, for example, in assessing fatigue damage experienced by the vehicle(s) in which they are installed, and are particularly helpful in the maintenance and operation of both single vehicles and fleets.

It may further be seen that processing of acceleration data according to rainflow counting algorithm(s) such that half-cycle counts are stored to facilitate later analysis of the asymmetry of the data (i.e. the up acceleration maximum magnitudes may not equal the down acceleration maximum magnitudes), can facilitate usage of such data in real time, or at any convenient or desired time, to generate full cycle acceleration histogram data by adding the up cycles to the down cycles according to magnitude priority consistent with rainflow counting algorithm.

While the steps of methods 400 are shown as occurring in a particular order, it will be appreciated by those skilled in the relevant arts that many of the process steps, and portions thereof, are interchangeable, and may occur in parallel, or in orders different than that shown, without materially affecting the end results of the methods 400. It will further be appreciated by such persons that not all of such steps may required in order to accomplish the purposes disclosed herein, and that further steps may be optionally implemented.

Further processes may be performed by any of the various components of the data acquisition system 112, as needed or desired. For example, calibration processes adapted to avoid issues of drift within the data acquisition devices 101 may be performed. For example, when a vehicle 125 is powered up (i.e., the ignition is energized), if the vehicle 125 is stationary, then data acquisition system 112 may perform initialization processes such as self-calibration, causing any or all of sensor(s) 214 to re-set to zero output readings. In order to perform such a self-calibration, a system 112 may need to determine whether the vehicle 125 is moving, and its orientation. This can be achieved using, for example, a calibration command or by monitoring the ground speed of the vehicle 125 using a speedometer, GPS, etc., and any desired assessment of orientation with respect to, for example, the vertical. Once a zero ground speed and other desired initial state data has been confirmed, data acquisition system 112 may calibrate itself to zero or any other desired value. Depending of the characteristics of data acquisition device(s) 101, for example, the reading from the system may be matched with 0 g or 1 g.

The data acquisition system 112 may also be capable of identifying missing and/or malfunctioning data acquisition devices 101. This may for example include a capability to perform diagnostics and cross-validation of the devices. For example, if one data acquisition device 101 on vehicle 125 detects a large or otherwise especially significant event and the others do not report any corresponding event, or if the first device records no event while others record significant events, it is possible that the first device has failed. The system 112 may be capable of diagnosing data acquisition device 101 failures such as out of range data, bad data and drift. When a failure is detected, a fault may be reported to any or all of processor(s) or devices 102, 120, 121.

As previously noted, systems 100, 112 and their various components may be used to facilitate or perform a wide variety of tasks using data recorded and/or processed by data acquisition devices 101 and/or sensors 214. Such tasks may be partially or wholly performed by any or all of processor(s) and devices 102, 204, 120, 121, using any suitably-configured stand-alone or distributed data/signal processing means.

Figure 5:
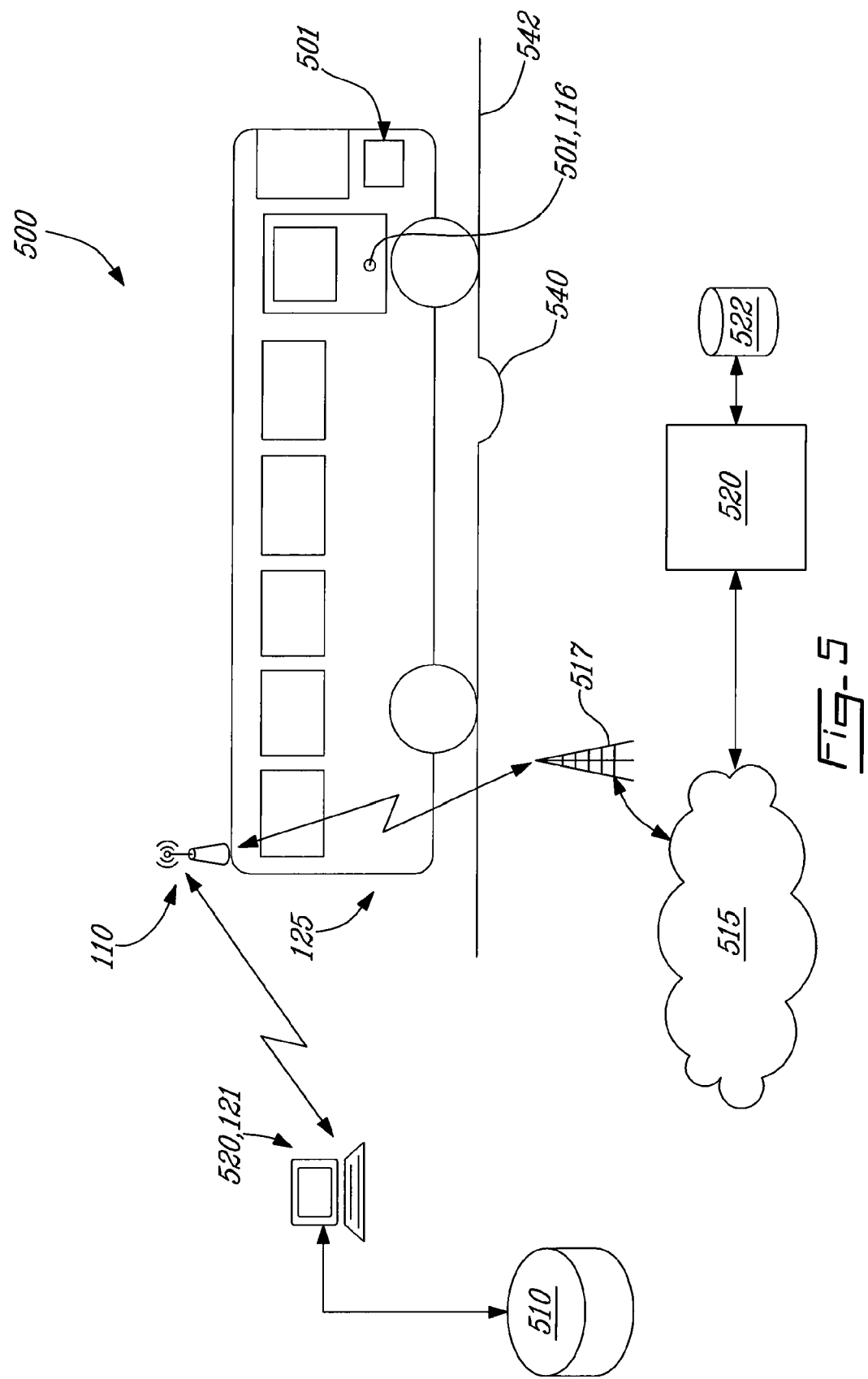
FIG. 5 shows a schematic diagram of an example system for relaying data relating to the structural loading or other operational condition of a vehicle to a third party device.

One example of such an advantageous feature of the invention is illustrated in FIG. 5. FIG. 5 provides a schematic diagram of an embodiment of a system 500 for relaying data collected and/or processed by system(s) 100, 112 on a vehicle 125 to one or more remote data processing systems 520 for further desired processing, and use in other processes. System(s) 500 can, for example, represent a fleet, traffic, or road management system(s) operated by any of a very wide variety of entities, including for example fleet, transit, or maintenance operations authorities.

In the example shown in FIG. 5, system 500 comprises a transit vehicle 125 incorporating a data acquisition system 112 (for clarity not shown) such as that shown in FIGS. 1 and 2, one or more GPSs 116, 501, and means 110 for wireless data communication, which may for example include modem(s), antennas, and other communications devices or systems. Signals representing data acquired by sensor(s) 101 and/or other components of the system(s) 112 can be forwarded by, or pulled from, onboard controller(s) 102, via bus(es) 115 and communications means 110 to remote processing system(s) 520 directly by, for example, transmission to wireless base station 517 and packet switching or other means to system 520 by via network 515, which may for example include any suitable communications system(s), including for example one or more public networks such as the internet, public switched telephone network (PSTN), and/or one or more public land mobile networks (PLMNs), and/or any suitably-configured private electronic communications system(s) (ECN(s)). Network(s) 515 may be adapted for carrying data according to any suitable IP or non-IP protocol(s) or method(s).

Alternatively, or in addition, such data may be forwarded to or pulled by remote system(s) 520 from diagnostic/maintenance system 121, which has already been discussed, using any suitable means. Data so pulled or transmitted can be stored in any or all of memory(ies) 510, 520 directly or indirectly accessible by processor(s) associated with the systems 120, 520, and may be stored on, transferred via, and processed using discs and other portable storage means.

Data so communicated may be used for any of a very wide variety of purposes, including monitoring the status of engines, environmental control systems, roads, tracks, or other routes or paths traveled by vehicle(s) 125, monitoring the performance of a vehicle 125 and/or its systems, its drivers or other operators, and/or flagging possible events for corresponding repair, inspection, scheduling, or other follow-up.

An example of the use of a system 500 in accordance with the invention is the monitoring of the status of roadways or other paths 542 traveled by transit vehicles such as buses, trains, etc. For example, a vehicle 125 traveling a path 542 strikes a pothole or other irregularity or discontinuity 540. As will be appreciated by those skilled in relevant arts, impact of a vehicle 125 with such an irregularity 540 can have a negative effect on vehicle life and/or performance, human safety and/or comfort, and traffic flow.

As a wheel or other portion of the vehicle 125 strikes the irregularity 540, a relatively sudden and jarring movement of portions of the vehicle, and any resultant response in corresponding vehicular structure, in the region of the wheel can be recorded by one or more accelerometers or other sensors 214 of suitably-placed data acquisition device(s) 501, 101. The fact of a recorded acceleration event in excess of a defined threshold, as described above, and/or any accelerations, strains, stresses, or other loadings experienced by the device(s) 501, 101 can be reported to one or more remote processor(s) 520 in for example, the manner(s) described above. For example, when a road feature/anomaly is detected by data acquisition system 112, information related to the feature/anomaly, as well as optionally information related to the time and/or the location of vehicle 125 when the feature/anomaly was detected, may be relayed using wireless transmitter 110 to a diagnostic/maintenance tool 121. Remote processing system(s) 520 can record data representing such fact and/or any desired or reported consequences or related data in memory(s) 522, and can cause a suitable report, and/or scheduling of road and/or vehicle maintenance, using any suitably-configured fully or partially automated processes.

Thus in various example embodiments the invention provides devices which can output signals, such as J1939 protocol messages, indicating that that one or more predefined acceleration levels have been experienced by a vehicle, or portions of the structure thereof, indicating that an out-of-norm situation has occurred, wherein such signal is capable of being relayed to other devices and combined with other messages such as GPS location, vehicle speed, driver identity, etc. to facilitate road or other path maintenance, vehicle maintenance, operator performance, and/or traffic conditions along defined paths. Additionally, a message may be relayed to the driver to provide various corresponding instructions, such as "slow down," and/or warnings or alerts, such as that a "structural event" has been recorded, so that he/she may learn and modify his/her driving style.

Thus in various embodiments a system 500 system may be capable of determining the relative impact of features or irregularities of the route on a vehicle(s) and also of making recommendations regarding fixing such irregularities, rerouting the vehicle(s), modifying the operation of the vehicle(s) (e.g. slowing down the vehicle(s) or other traffic at the identified problem areas) and/or reporting the information to any desired third party(ies), such as road maintenance and/or law enforcement agencies. Such embodiments may alternately or in addition be used to monitor and repair damage to vehicles; to facilitate the performance of on-going or scheduled vehicle or road maintenance programs; to monitor driver or other operator performance; and to monitor and report traffic events such as road or path damage, construction sites, accidents, etc., and to re-route vehicles accordingly.

For example, in various embodiments system(s) 500 may be used to provide systems, methods, devices, and computer programming products for using data provided by vehicles 125 equipped with appropriately-configured systems 112 and devices 101, 102, 104, 116, 118, etc., in accordance with the disclosure herein, including for example on-board and/or remote data processors 204, 102, 120, 121, 520, etc. to generate and/or provide to any or all of processors 102, 120, 121, 520, etc., signals representing data useful for determining the location of a structural event such as the striking of a pothole, curb, vehicle, or other fixed or moveable object by such a vehicle; determining the location of the structural event experienced by the vehicle on a route or path traveled by the vehicle; and, using the determined location, generating signals useful for scheduling a path repair or maintenance activity to be conducted at the determined location. Such signals may be used, for example, to generate paper or electronic reports, and may be used to provide real time or batch-processed instructions for repair crews, etc.

In the same or other embodiments, the invention provides systems, methods, devices, and computer programming products for scheduling repair and/or maintenance of vehicles 125. Such methods according to such aspects of the invention may be performed by on-board and/or remote data processors, 204, 102, 120, 121, 520, etc., and may include generating and/or providing signals representing data generated aboard at least one vehicle 125, the data generated using signals provided by one or more sensors 214, 116, 118, etc., attached to the vehicle(s) in response to structural events experienced by the vehicle(s) 125; using the received signals, generating signals useful for scheduling repair or maintenance activities to be performed on the vehicle 125; and outputting to any or all processors 102, 120, 121, 520, etc., the generated signals useful for scheduling repair or maintenance activities to be performed on the vehicle(s) in a form useful in performing the repair or maintenance activity. Data relating to such structural events may be gathered and processed in an ongoing and/or batch type manner, and/or may be reported and used for maintenance and/or repair purposes in an exception-type processing. For example, such data may be used as a part of ongoing monitoring of fatigue issues in a vehicle or fleet, and/or may be used to report, and respond to, optionally in real time, exceptional events such as accidents or other damage-causing incidents.

As a further example, the invention provides systems, methods, devices, and computer programming products useful for routing vehicles 125 around accidents, construction sites, and/or other traffic events or anomalies on a spot or ongoing basis. Methods according to such aspects of the invention may be performed by on-board and/or remote data processors 204, 102, 120, 121, 520 etc., and may include receiving signals representing data generated aboard at least one transit or other vehicle 125, the signals useful for determining the time and location of a traffic event experienced by the vehicle, such as an accident, an encounter with a previously unknown construction site, etc.; determining the time and location of the traffic event experienced by the vehicle on a path traveled by the vehicle, using, for example, GPS 118 and/or clock 116; and using the stored signals representing the determined time and location to generate signals useful for routing the same or other transit vehicles to avoid the traffic event.

In the same or other embodiments, the invention provides systems, methods, devices, and computer programming products for monitoring the use, scheduling repair and/or maintenance, and/or monitoring the warranty condition of engines, environmental control systems, and/or other systems of vehicles 125. Such methods according to such aspects of the invention may be performed by on-board and/or remote data processors, 204, 102, 120, 121, 520, etc., and may include generating and/or providing signals representing temperature, pressure, humidity, torque, operating speed, and other data generated aboard at least one vehicle 125, the data generated using signals provided by one or more sensors 214, 116, 118, etc., attached to the vehicle(s) in response to operational usage experienced by the vehicle(s) 125 and their engines, environmental control systems, and other systems; using the received signals, generating signals useful for scheduling repair or maintenance activities to be performed on the vehicle 125, and/or their status under warranties or guarantees; and outputting to any or all processors 102, 120, 121, 520, etc., the generated signals useful for scheduling repair or maintenance activities to be performed on the vehicle(s), or to make corresponding reports, in suitable form(s). Data relating to such structural events may be gathered and processed in an ongoing and/or batch type manner, and/or may be reported and used for maintenance and/or repair purposes in an exception-type processing.

Diagnostic/maintenance tool(s) 121 and other data processing devices used in accordance with the disclosure may be configured to receive wireless signals from wireless transmitter(s) 110 relating to road features/anomalies experienced by vehicle 125. In some embodiments, diagnostic/maintenance tool 121 may process data gathered from wireless transmitter 110 into a memory 510 and/or process such data according to any of the descriptions herein. Such information may be processed immediately and/or stored for later analysis. In some embodiments, diagnostic/maintenance tool 121 may transmit information regarding road features/anomalies to one or more third party system 520 via network(s) 515. Such information, and/or information provided or otherwise processed by any system(s) 520, may be transmitted to further systems 121, 520, or otherwise processed at predetermined intervals or in response to particular events, such as in response to the detection of an anomaly 540.

As noted, third party or remote system(s) 520 may include systems and/or devices owned, operated, or otherwise accessible by one or more public bodies responsible for overseeing or maintaining the road conditions of routes utilized by vehicle 125. For example, device(s) 520 may be associated with one or more departments of a city or other governmental entity responsible for maintaining or improving road conditions, law enforcement, etc. When a road anomaly, such as a pot hole or unexpected bump, is detected by vehicle 125, this information may be relayed by diagnostic/maintenance tool 121 through communication cloud 515 to alert a maintenance department to the location of the road anomaly, and schedule any required or desired maintenance or repairs.

While the invention has been described and illustrated in connection with specific, presently-preferred embodiments, many variations and modifications may be made without departing from the spirit and scope of the invention. The invention is therefore not to be limited to the exact components or details of methodology or constructions set forth above. Except to the extent necessary or inherent in the processes themselves, no particular order to steps or stages of methods or processes described in this disclosure, including the Figures, is intended or implied. In many cases the order of process steps may be varied without changing the purpose or effect of the methods described. The scope of the claims is to be defined solely by the appended claims, giving due consideration to the doctrine of equivalents and related doctrines.

Data processors and programming structures are not limited to any particular operating systems, devices, architectures, architecture or programming languages.

I claim:

1. A method of using a system for acquiring data related to service operation of a passenger bus, the system comprising:

one or more sensors configured for sensing one or more service operating conditions experienced by at least one vehicle system of the passenger bus, and for providing corresponding output signals;

at least one data processor configured for applying an amplitude counting algorithm to count a number of times said output signals exceed at least one specified amplitude, and to generate data representing said count; and memory usable by the at least one data processor for storing the data representing said count; and the method performed by the same or another data processor, and comprising:

accessing, in the same or another memory, the data representing the count of the number of times the output signals exceed at least one specified amplitude, and using the accessed data, monitoring operation of the passenger bus by associating the accessed data with a road traveled by the passenger bus, scheduling maintenance for the road based on the associated data.

2. The method of claim 1, wherein monitoring operation of the passenger bus comprises further comprising scheduling maintenance for the passenger bus using the accessed data.

3. The method of claim 1, wherein monitoring operation of the passenger bus comprises further comprising associating the accessed data with an operator of the passenger bus.

4. The method of claim 1, wherein the data representing the count of the number of times the output signals exceed at least one specified amplitude is accessed by using a wireless communication device, and the method is performed by a processor remote from the passenger bus.

5. A method of using a system for acquiring data related to service operation of a passenger bus, the system comprising:

one or more sensors configured for sensing one or more service operating conditions experienced by at least one vehicle system of the passenger bus, and for providing corresponding output signals;

at least one data processor configured for applying an amplitude counting algorithm to count a number of times said output signals exceed at least one specified amplitude, and to generate data representing said count; and memory usable by the at least one data processor for storing the data representing said count; and the method performed by the same or another data processor, and comprising:

accessing, in the same or another memory, the data representing the count of the number of times the output signals exceed at least one specified amplitude, and monitoring operation of the passenger bus by associating the accessed data with a route traveled by the passenger bus and causing the same or another bus to travel a different route to avoid a traffic event or anomaly detected on the route based on the accessed data.

6. The method of claim 5, wherein monitoring operation of the passenger bus further comprises scheduling maintenance for the passenger bus based on the accessed data.

7. The method of claim 5, wherein monitoring operation of the passenger bus further comprises associating the accessed data with an operator of the passenger bus.

8. The method of claim 5, wherein monitoring operation of the passenger bus further comprises generating a report of a traffic event or anomaly by associating the accessed data with the route traveled by the passenger bus.

9. The method of claim 5, wherein the data representing the count of the number of times the output signals exceed at least one specified amplitude is accessed by using a wireless communication device, and the method is performed by a processor remote from the passenger bus.

10. A method of using a system for acquiring data related to service operation of a passenger bus, the system comprising:
one or more sensors configured for sensing one or more service operating conditions experienced by at least one vehicle system of the passenger bus, and for providing corresponding output signals;
at least one data processor configured for applying an amplitude counting algorithm to count a number of times said output signals exceed at least one specified amplitude, and to generate data representing said count; and
memory usable by the at least one data processor for storing the data representing said count; and
the method performed by the same or another data processor, and comprising:
accessing, in the same or another memory, the data representing the count of the number of times the output signals exceed at least one specified amplitude, and
monitoring operation of the passenger bus by associating the accessed data with a route traveled by the passenger bus and generating a report of a traffic event or anomaly detected on the route based on the accessed data.

11. The method of claim 10, wherein monitoring operation of the passenger bus further comprises scheduling maintenance for the passenger bus based on the accessed data.

12. The method of claim 10, wherein monitoring operation of the passenger bus further comprises associating the accessed data with an operator of the passenger bus.

13. The method of claim 10, wherein the data representing the count of the number of times the output signals exceed at least one specified amplitude is accessed by using a wireless communication device, and the method is performed by a processor remote from the passenger bus.

14. A remote monitoring system for a passenger bus, the system comprising:
memory for storing data generated by a data acquisition system of the passenger bus, the data generated, from output signals provided by one or more sensors configured for sensing one or more service operating conditions experienced by the passenger bus, by applying an amplitude counting algorithm to count a number of times the output signals exceed at least one specified amplitude; and
at least one data processor configured for accessing the data stored in the memory representing the count of the number of times the output signals exceed the at least one specified amplitude and, by associating the accessed data with a road traveled by the passenger bus, scheduling maintenance for the road based on the associated data.

15. The system of claim 14, wherein the at least one processor is further configured to schedule maintenance for the passenger bus using the accessed data.

16. The system of claim 14, wherein the at least one processor is further configured to associate the accessed data with an operator of the passenger bus.

17. The system of claim 14, further comprising a wireless communication device configured to communicate remotely with the data acquisition of the passenger bus to receive the data representing the count of the number of times the output signals exceed at least one specified amplitude for storage in the memory.

18. A remote monitoring system for a passenger bus, the system comprising:
memory for storing data generated by a data acquisition system of the passenger bus, the data generated, from output signals provided by one or more sensors configured for sensing one or more service operating conditions experienced by the passenger bus, by applying an amplitude counting algorithm to count a number of times the output signals exceed at least one specified amplitude; and
at least one data processor configured for accessing the data stored in the memory representing the count of the number of times the output signals exceed the at least one specified amplitude, and monitoring operation of the passenger bus by associating the accessed data with a route traveled by the passenger bus and causing the same or another bus to travel a different route to avoid a traffic event or anomaly detected on the route based on the accessed data.

19. The system of claim 18, wherein the at least one processor is configured to monitor operation of the passenger bus further by scheduling maintenance for the passenger bus based on the accessed data.

20. The system of claim 18, wherein the at least one processor is configured to monitor operation of the passenger bus further by associating the accessed data with an operator of the passenger bus.

21. The system of claim 18, wherein the at least one processor is configured to monitor operation of the passenger bus further by generating a report of a traffic event or anomaly by associating the accessed data with the route traveled by the passenger bus.

22. The system of claim 18, further comprising a wireless communication device configured to communicate remotely with the data acquisition of the passenger bus to receive the data representing the count of the number of times the output signals exceed at least one specified amplitude for storage in the memory.

23. A remote monitoring system for a passenger bus, the system comprising:
memory for storing data generated by a data acquisition system of the passenger bus, the data generated, from output signals provided by one or more sensors configured for sensing one or more service operating conditions experienced by the passenger bus, by applying an amplitude counting algorithm to count a number of times the output signals exceed at least one specified amplitude; and
at least one data processor configured for accessing the data stored in the memory representing the count of the number of times the output signals exceed the at least one specified amplitude, and monitoring operation of the passenger bus by associating the accessed data with a route traveled by the passenger bus and generating a report of a traffic event or anomaly detected on the route based on the accessed data.

24. The system of claim 23, wherein the at least one processor is configured to monitor operation of the passenger bus further by scheduling maintenance for the passenger bus based on the accessed data.

25. The system of claim 23, wherein the at least one processor is configured to monitor operation of the passenger bus further by associating the accessed data with an operator of the passenger bus.

26. The system of claim 23, further comprising a wireless communication device configured to communicate remotely with the data acquisition of the passenger bus to receive the data representing the count of the number of times the output signals exceed at least one specified amplitude for storage in the memory.

* * * * *